US012373653B2

(12) United States Patent
Yang et al.

(10) Patent No.: US 12,373,653 B2
(45) Date of Patent: Jul. 29, 2025

(54) TEXT CHECKING METHOD BASED ON KNOWLEDGE GRAPH, ELECTRONIC DEVICE, AND MEDIUM

(71) Applicant: BEIJING BAIDU NETCOM SCIENCE TECHNOLOGY CO., LTD., Beijing (CN)

(72) Inventors: Tianxing Yang, Beijing (CN); Chen Yang, Beijing (CN); Zhuo Sun, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 292 days.

(21) Appl. No.: 17/821,244

(22) Filed: Aug. 22, 2022

(65) Prior Publication Data

US 2022/0391598 A1  Dec. 8, 2022

(30) Foreign Application Priority Data

Aug. 30, 2021  (CN) .......................... 202111005347.1

(51) Int. Cl.
*G06F 40/00* (2020.01)
*G06F 40/40* (2020.01)
*G06N 5/02* (2023.01)

(52) U.S. Cl.
CPC .............. *G06F 40/40* (2020.01); *G06N 5/02* (2013.01)

(58) Field of Classification Search
CPC ........ G06F 40/30; G06F 40/10; G06F 40/131; G06F 40/14; G06F 40/151; G06F 40/16; G06F 40/189; G06F 40/20; G06F 40/205; G06F 40/211; G06F 40/226; G06F 40/232; G06F 40/279; G06F 40/295; G06F 40/40; G06F 16/367; G06F 16/36; G06F 16/374; G06F 40/106; G06F 40/117; G06F 40/103; G06F 40/237; G06F 40/242;

(Continued)

(56) References Cited

U.S. PATENT DOCUMENTS 11,087,219 B1   8/2021  Brecque
2017/0124497 A1  5/2017  Crabtree et al.
(Continued)

FOREIGN PATENT DOCUMENTS

CN   109190098 A   1/2019
CN   109344382 A   2/2019
(Continued)

OTHER PUBLICATIONS

English translation of the above CN-115081431-A, Sep. 20, 2020.*
(Continued)

*Primary Examiner* — Edgar X Guerra-Erazo
(74) *Attorney, Agent, or Firm* — Osha Bergman Watanabe & Burton LLP (57) ABSTRACT

The present disclosure provides a text checking method based on a knowledge graph, an electronic device and a medium. The method includes: obtaining a text of a contract to be checked; establishing a knowledge graph according to the text of the contract to be checked, the knowledge graph including a plurality of attributes and a plurality of attribute values corresponding to the plurality of attributes; and checking the text of the contract to be checked based on the knowledge graph.

9 Claims, 7 Drawing Sheets

(58) Field of Classification Search
CPC .... G06F 40/247; G06F 40/253; G06F 40/268; G06F 40/284; G06F 40/289; G06F 40/35; G06N 5/02; G06N 5/022; G06N 5/025; G06N 5/00; G06N 5/048; G06N 7/02; G06N 7/023; G06N 7/026; G06N 20/20; G06N 20/00; G06Q 10/0635; G06Q 10/0633
USPC ................ 704/9, 1, 2.3, 4, 5, 7, 10, 257
See application file for complete search history.

(56) References Cited

U.S. PATENT DOCUMENTS

| | | | |
|---|---|---|---|
| 2018/0052884 | A1 | 2/2018 | Kale et al. |
| 2019/0171944 | A1* | 6/2019 | Lu .................... G06N 5/022 |
| 2021/0158463 | A1* | 5/2021 | Madl .................. G06Q 20/405 |
| 2021/0383247 | A1* | 12/2021 | Brecque ............... G06F 40/16 |
| 2022/0350690 | A1* | 11/2022 | Sun ................... G06Q 10/06395 |

FOREIGN PATENT DOCUMENTS

| | | |
|---|---|---|
| CN | 110442872 A | 11/2019 |
| CN | 112396437 A | 2/2021 |
| CN | 112883197 A | 6/2021 |
| CN | 113312902 A | 8/2021 |
| CN | 115081431 A * | 9/2022 |

OTHER PUBLICATIONS

Liu, Zhibin, et al. "Knowledge aware conversation generation with explainable reasoning over augmented graphs." arXiv preprint arXiv:1903.10245 (2019). (Year: 2019).*

Office Action issued for corresponding Chinese patent application No. 202111005347.1, mailed May 23, 2022 (15 pages).

Second Office Action issued for corresponding Chinese patent application No. 202111005347.1, mailed Jul. 29, 2022 (30 pages).

Bao, et al; "Customs declaration and inspection certificate operation manual Customs document;" Edition Library of China CP Data Nuclear Science, No. 098993; 2013 (10 pages).

Extended European Search Report issued in European Application No. 22191625.7, mailed on Jan. 19, 2023 (7 pages).

Mario Mezzanzanica et al.; "A Model-Based Approach for Developing Data Cleansing Solutions;" ACM Journal of Data and Information Quality; vol. 5; No. 4; Article 13; Feb. 2015; pp. 1-28 (28 pages).

* cited by examiner

TEXT CHECKING METHOD BASED ON KNOWLEDGE GRAPH, ELECTRONIC DEVICE, AND MEDIUM

CROSS-REFERENCE TO RELATED APPLICATION

This application claims priority to Chinese Patent Application No. 202111005347.1 filed on Aug. 30, 2021, the disclosure of which is hereby incorporated by reference in its entirety.

FIELD

The present disclosure relates to the fields of knowledge graph, natural language processing, and deep learning in the technical field of artificial intelligence, and in particular, to a text checking method based on a knowledge graph, an electronic device and a medium.

BACKGROUND

Compliance check is a common and difficult problem in the field of contracts. Sales contracts are a type of contract with a wide range of application scenarios and a large number of accumulation. Checking the potential risks in a contract becomes a general and typical problem.

SUMMARY

According to an aspect of the present disclosure, a text checking method based on a knowledge graph is provided. The method includes: obtaining a text of a contract to be checked; establishing a knowledge graph according to the text of the contract to be checked, the knowledge graph including a plurality of attributes and a plurality of attribute values corresponding to the plurality of attributes; and checking the text of the contract to be checked based on the knowledge graph.

According to another aspect of the present disclosure, an electronic device is provided. The electronic device includes at least one processor; and a memory communicatively connected to the at least one processor. The memory is stored with instructions executable by the at least one processor, when the instructions are performed by the at least one processor, the at least one processor is caused to perform the text checking method based on a knowledge graph according to the present disclosure.

According to another aspect of the present disclosure, a non-transitory computer readable storage medium stored with computer instructions is provided. The computer instructions are configured to cause a computer to perform the text checking method based on a knowledge graph according to the present disclosure.

According to another aspect of the present disclosure, a computer program product including a computer program is provided. When the computer program is executed by a processor, the text checking method based on a knowledge graph according to the present disclosure is implemented.

It should be understood that, the content described in this part is not intended to identify key or important features of embodiments of the disclosure, nor intended to limit the scope of the disclosure. Other features of the disclosure will be easy to understand through the following specification.

BRIEF DESCRIPTION OF THE DRAWINGS

The drawings are intended to better understand the solution, and do not constitute a limitation to the disclosure.

DETAILED DESCRIPTION

The following describes the exemplary embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

Artificial intelligence (AI) is a technical science that studies and develops theories, methods, technologies and application systems for simulating, extending and expanding human intelligence. At present, AI technology has advantages of high degree of automation, high accuracy and low cost, and has been widely used.

Knowledge graph (KG), known as knowledge domain visualization or knowledge domain mapping map in the library and information industry, is a series of various graphs showing the development process and structure relationship of knowledge, which use the visualization technology to describe knowledge resources and their carriers, and to mine, analyze, construct, draw and display the knowledge and interrelations between the knowledge. The knowledge graph is a modern theory that combines theories and methods of applied mathematics, graphics, information visualization technology, information science and other disciplines with metrological citation analysis, co-occurrence analysis and other methods, and uses a visual graph to visually display the core structure, history of development, frontier fields and overall knowledge structure of the disciplines to achieve the purpose of multi-disciplinary integration, which can provide practical and valuable reference for disciplinary research.

Natural language processing (NLP) is a science that studies computer systems that can effectively realize natural language communication, especially software systems, and is an important direction in the field of computer science and artificial intelligence.

Deep learning (DL) is a new research direction in the field of machine learning (ML), which learns the inherent laws and representation levels of sample data. The information obtained during the learning process is of great help in the interpretation of data such as words, images and sounds. Its ultimate goal is to enable machines to have the ability to analyze and learn like humans, and to recognize data such as words, images, and sounds. In terms of the specific research contents, it mainly includes neural network systems based on convolution operations, namely convolutional neural networks; auto-encoding neural networks based on multi-layer neurons; and deep belief networks which perform pre-training in the form of multi-layer auto-encoding neural networks, and then optimizes the neural network weights with the discriminative information. Deep learning has achieved a lot in the search technology, data mining, machine learning, machine translation, natural language processing, multimedia learning, speech, recommendation and personalization technology, and other related fields.

A text checking method and apparatus based on a knowledge graph, an electronic device and a storage medium will be described with reference to the accompany drawings.

Figure 1:
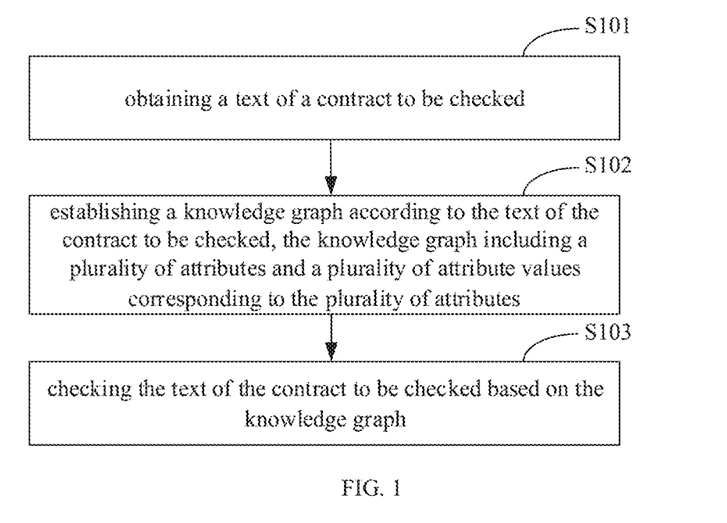
FIG. 1 is a flowchart illustrating a text checking method based on a knowledge graph according to an embodiment of the present disclosure.

FIG. 1 is a flowchart illustrating a text checking method based on a knowledge graph according to an embodiment of the present disclosure.

As illustrated in FIG. 1, the text checking method based on a knowledge graph according to an embodiment of the present disclosure includes the following steps.

S101, a text of a contract to be checked is obtained.

In some embodiments, an execution subject of the text checking method based on a knowledge graph according to the embodiment of the present disclosure may be a text checking apparatus based on a knowledge graph provided in the embodiment of the present disclosure, and the text checking apparatus based on a knowledge graph may be a hardware device with data information processing capability and/or necessary software required to drive the hardware device to work. In some embodiments, the execution subject may include workstations, servers, computers, user terminals and other devices. The user terminals include but are not limited to mobile phones, computers, intelligent voice interaction devices, smart home appliances, vehicle-mounted terminals, and the like.

In some embodiments of the present disclosure, the text of the contract to be checked may be a text of an original contract provided by a user, and can also be referred as a contract text.

S102, a knowledge graph is established according to the text of the contract to be checked, the knowledge graph includes a plurality of attributes and a plurality of attribute values corresponding to the plurality of attributes.

In some embodiments, key attributes in a contract field and an attribute value corresponding to each attribute are extracted according to the text of the contract to be checked obtained in step S101. For example, a text of a specific sales contract is used as an entity, and a contract number, a signature date, a contract amount, liquidated damages, a delivery date, a contract type, signatories, signing companies; names of party A and party B, etc. are used as attributes, a serial number value corresponding to the contract number attribute is "***"; and a specific date corresponding to the signing date attribute is "*year*month*day" etc. are used as the attribute values corresponding to the attributes, to establish the knowledge graph. It should be noted that an attribute may appear multiple times in a contract text, and the established knowledge graph may include the attribute appearing multiple times and an attribute value corresponding to the attribute each time it appears.

S103, the text of the contract to be checked is checked based on the knowledge graph.

In some embodiments, the contract text is automatically checked according to the knowledge graph established in step S102, so as to quickly and accurately identify risks in the contract text.

In conclusion, with the text checking method based on a knowledge graph according to the embodiment of the present disclosure, the contract text to be checked is obtained, and the knowledge graph is established according to the contract text to be checked. The knowledge graph includes multiple attributes and attribute values corresponding to the multiple attributes. The contract text is checked based on the knowledge graph. With the text checking method based on a knowledge graph according to the embodiments of the present disclosure, the knowledge graph is established according to the contract text, and the contract text is automatically checked based on the knowledge graph in combination with natural language processing, which saves manpower, and has a faster check speed and reduces identification omission or identification error of risks.

Figure 2:
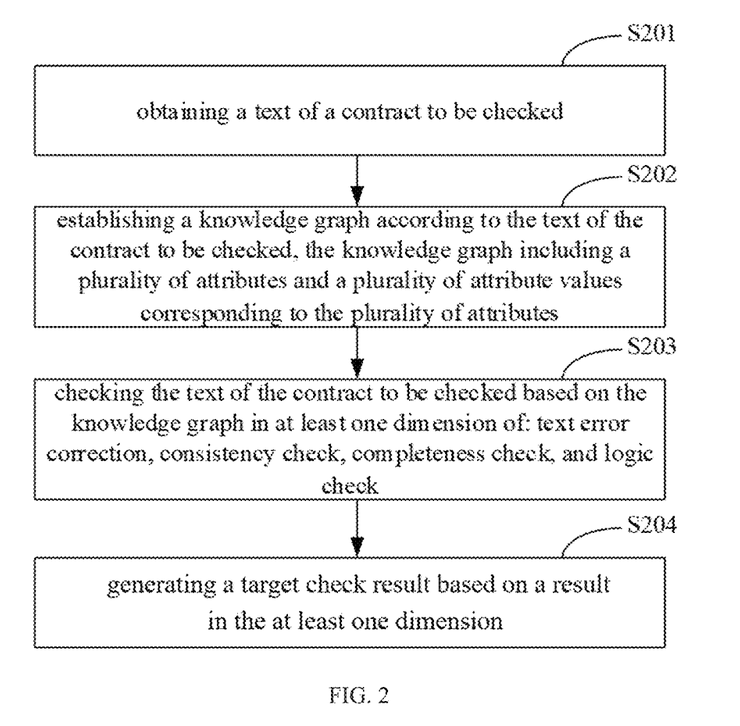
FIG. 2 is a flowchart illustrating a text checking method based on a knowledge graph according to an embodiment of the present disclosure.

FIG. 2 is a flowchart illustrating a text checking method based on a knowledge graph according to an embodiment of the present disclosure. As illustrated in FIG. 2, on the basis of the embodiment illustrated in FIG. 1, the text checking method based on a knowledge graph according to embodiments of the present disclosure may include the following steps S201-S204.

S201, a text of a contract to be checked is obtained.

S202, a knowledge graph is established according to the text of the contract to be checked, the knowledge graph includes a plurality of attributes and a plurality of attribute values corresponding to the plurality of attributes.

Steps S201-S202 in embodiments of the present disclosure are the same as steps S101-S102 in the above-mentioned embodiments, and are not repeated here.

The step S103 of "checking the text of the contract to be checked based on the knowledge graph" in the above embodiments may include the following step S203.

S203, the text of the contract to be checked is checked based on the knowledge graph in at least one dimension of: text error correction, consistency check, completeness check, and logic check.

In some embodiments, the contract text is checked in at least one of the following dimensions based on the knowledge graph established in step S202: the text error correction, the consistency check, the completeness check, the logic check, and the like. The text error correction is used to check compliance issues such as misspelled characters at a writing level of a contract document. The consistency check is used to identify issues such as context consistency in a contract. The completeness check is used to check whether there is an obvious omission of a necessary term during checking. The logic check is used to check whether the logic of contract elements is compliant.

S204, a target check result is generated based on a result in the at least one dimension.

In some embodiments, the target check result is generated according to the at least one check result in the at least one dimension in step S203. For example, as long as a check result of one dimension is failed, the target check result is failed, and the contract text may be modified. If all the check results in the at least one dimension are successful, the target check result is successful, and the contract text does not need to be modified.

Figure 3:
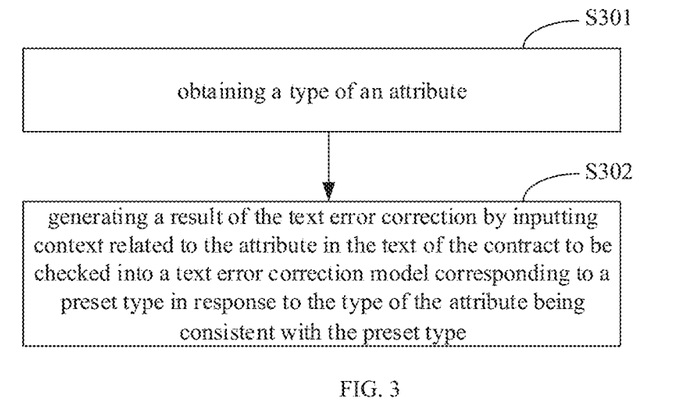
FIG. 3 is a flowchart illustrating a text checking method based on a knowledge graph according to an embodiment of the present disclosure.

Further, as illustrated in FIG. 3, on the basis of the embodiment illustrated in FIG. 2, the step S203 "performing the text error correction on the text of the contract to be checked based on the knowledge graph" may include following steps S301-S302.

S301, a type of an attribute is obtained.

In some embodiments, based on types of the attributes obtained by natural language processing, the types of the attributes may include but are not limited to a date type, an amount type, etc. For example, the types of attributes such as the signature date and the delivery date are the date type, and the types of attributes such as the contract amount and the liquidated damages are the amount type.

S302, a result of the text error correction is generated by inputting context related to the attribute in the text of the contract to be checked into a text error correction model corresponding to a preset type in response to the type of the attribute being consistent with the preset type.

In some embodiments, the types of some attributes are set as preset types in advance, and the preset types may include the date type, the amount type, etc. Each preset type is set with a corresponding text error correction model. If the type of the attribute obtained in step S301 is consistent with the preset type, the context related to the attribute in the contract text is input into the text error correction model corresponding to the preset type, and the result of the text error correction is generated. For example, the type of the attribute "signature date" is the date type, the context related to the signature date in the contract text is input into the [Date Error Correction Model], and an error similar to "signature Date: Jan. 1, 2999" can be identified. The type of the attribute "Liquidated Damages" is the amount type, the context related to the liquidated damages in the contract text is input into the [Amount Error Correction Model] to identify errors such as negative numbers and non-numbers.

Figure 4:
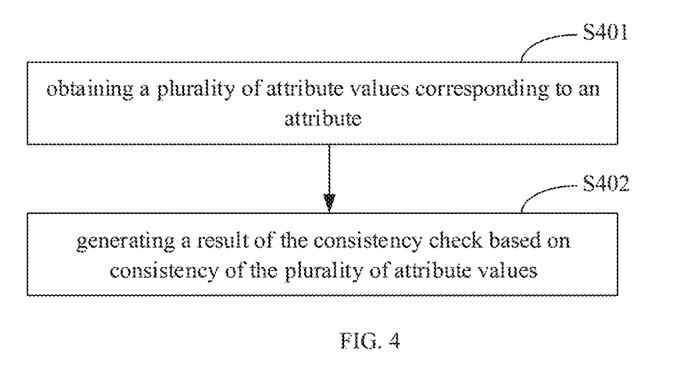
FIG. 4 is a flowchart illustrating a text checking method based on a knowledge graph according to an embodiment of the present disclosure.

Further, as illustrated in FIG. 4, on the basis of the embodiment illustrated in FIG. 2, the step S203 "performing the consistency check on the text of the contract to be checked based on the knowledge graph" may include following steps S401-S402.

S401, a plurality of attribute values corresponding to an attribute are obtained.

In some embodiments, multiple attribute values corresponding to one attribute in multiple links of the contract are obtained. For example, a delivery date on the first page of the contract and a delivery date in the contract body are obtained.

S402, a result of the consistency check is generated based on consistency of the plurality of attribute values.

In some embodiments, the consistency check is performed according to the plurality of attribute values corresponding to the same attribute obtained in step S401, and the result of the consistency check, i.e., a consistency check result is generated. The consistency check result may include a successful consistency check and a failed consistency check. For example, the delivery date on the first page of the contract is Jan. 1, 2002, and the delivery date extracted from the middle of the contract is Jan. 1, 2003, then the generated consistency check result is that the consistency check fails. For example, if the legal representative of party A at the beginning of the contract is Zhang San, and the legal representative of party A at the end of the contract is Li Si, then the generated consistency check result is the consistency check fails.

Figure 5:
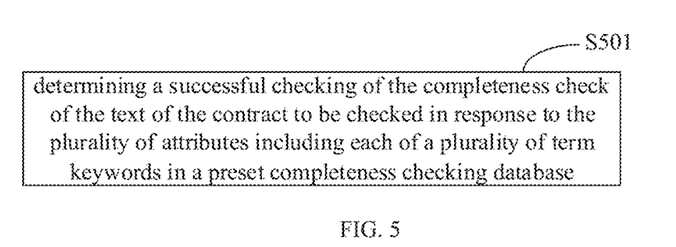
FIG. 5 is a flowchart illustrating a text checking method based on a knowledge graph according to an embodiment of the present disclosure.

Further, as illustrated in FIG. 5, on the basis of the embodiment illustrated in FIG. 2, the step S203 "performing the completeness check on the text of the contract to be checked based on the knowledge graph" may include a following step S501.

S501, a successful checking of the completeness check of the text of the contract to be checked is determined in response to the plurality of attributes including each of a plurality of term keywords in a preset completeness checking database.

In some embodiments, the completeness checking database is preset based on industry expert research, and the completeness check database includes multiple term keywords. If the obtained multiple attributes in the contract text include each of a plurality of term keywords in the preset completeness checking database, the completeness check of the contract text is successful. For example, a contract must have terms such as a buyer and a seller, a subject matter of the contract, delivery and acceptance, and an acceptance manner. If the contract does not have an acceptance manner or party A and party B, the completeness check is failed. The term keywords may include party A, party B, payment, acceptance, payment, etc.

Figure 6:
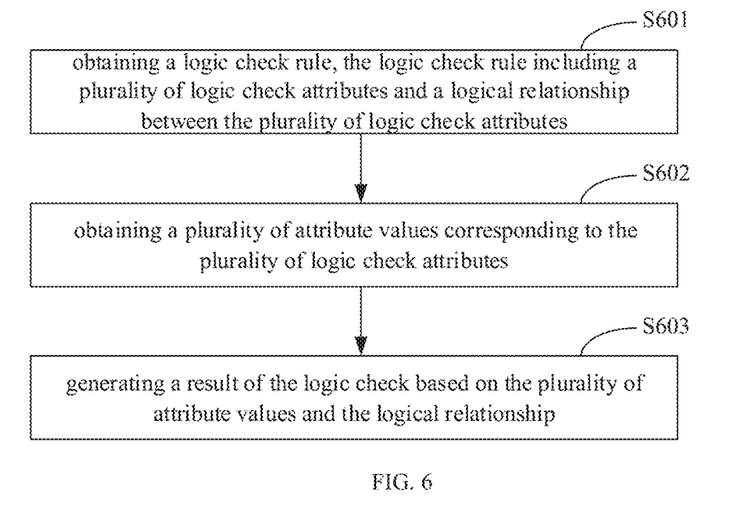
FIG. 6 is a flowchart illustrating a text checking method based on a knowledge graph according to an embodiment of the present disclosure.

Further, as illustrated in FIG. 6, on the basis of the embodiment illustrated in FIG. 2, the step S203 "performing the logic check on the text of the contract to be checked based on the knowledge graph" may include following steps S601-S603.

S601, a logic check rule is obtained, the logic check rule includes a plurality of logic check attributes and a logical relationship between the plurality of logic check attributes.

In some embodiments, the logic check rule is obtained, for example, the logic check rule may be a rule that a sum of payment amounts o in multiple batches of the contract should be equal to a total contract price, etc. The logic check rule may include a logical relationship between multiple preset logic check attributes. For example, multiple logic check attributes of a sales contract are preset as a first delivery price P1, a second delivery price P2 and the total contract price P, and the logical relationship between the multiple logic check attributes is P1+P2=P.

S602, a plurality of attribute values corresponding to the plurality of logic check attributes are obtained.

In some embodiments, multiple attribute values corresponding to the multiple logic check attributes are obtained based on the knowledge graph establishing result. For example, the first delivery price P1 of the above-mentioned sales contract is 3 million, the second delivery price P2 1 million, and the total contract price P is 5 million.

S603, a result of the logic check is generated based on the plurality of attribute values and the logical relationship.

In some embodiments, according to the multiple attribute values corresponding to the multiple logic check attributes obtained in step S602 and the logical relationship between the multiple logic check attributes obtained in step S601, the result of the logic check, i.e., a logic check result is generated. For example, the sum P1+P2 of the first delivery price P1 and the second delivery price P2 in the above-mentioned sales contract is 4 million, which is not equal to the total contract price P=5 million, then the logic check of the contract fails.

In conclusion, with the text checking method based on a knowledge graph according to the embodiment of the present disclosure, the contract text to be checked is obtained, and the knowledge graph is established according to the contract text to be checked. The knowledge graph includes multiple attributes and attribute values corresponding to the multiple attributes. The contract text is checked based on the knowledge graph. With the text checking method based on a knowledge graph according to the embodiments of the present disclosure, the knowledge graph is established according to the contract text, the contract text is automatically checked based on the knowledge graph in combination with natural language processing, the contract text check is decomposed into different dimensions such as the text error correction, the consistency check, the completeness check, and the logic check, and different technical ideas and solutions are adopted to automate the check process, which saves manpower, and has a faster check speed and reduces identification omission or identification error of risks.

Figure 7:
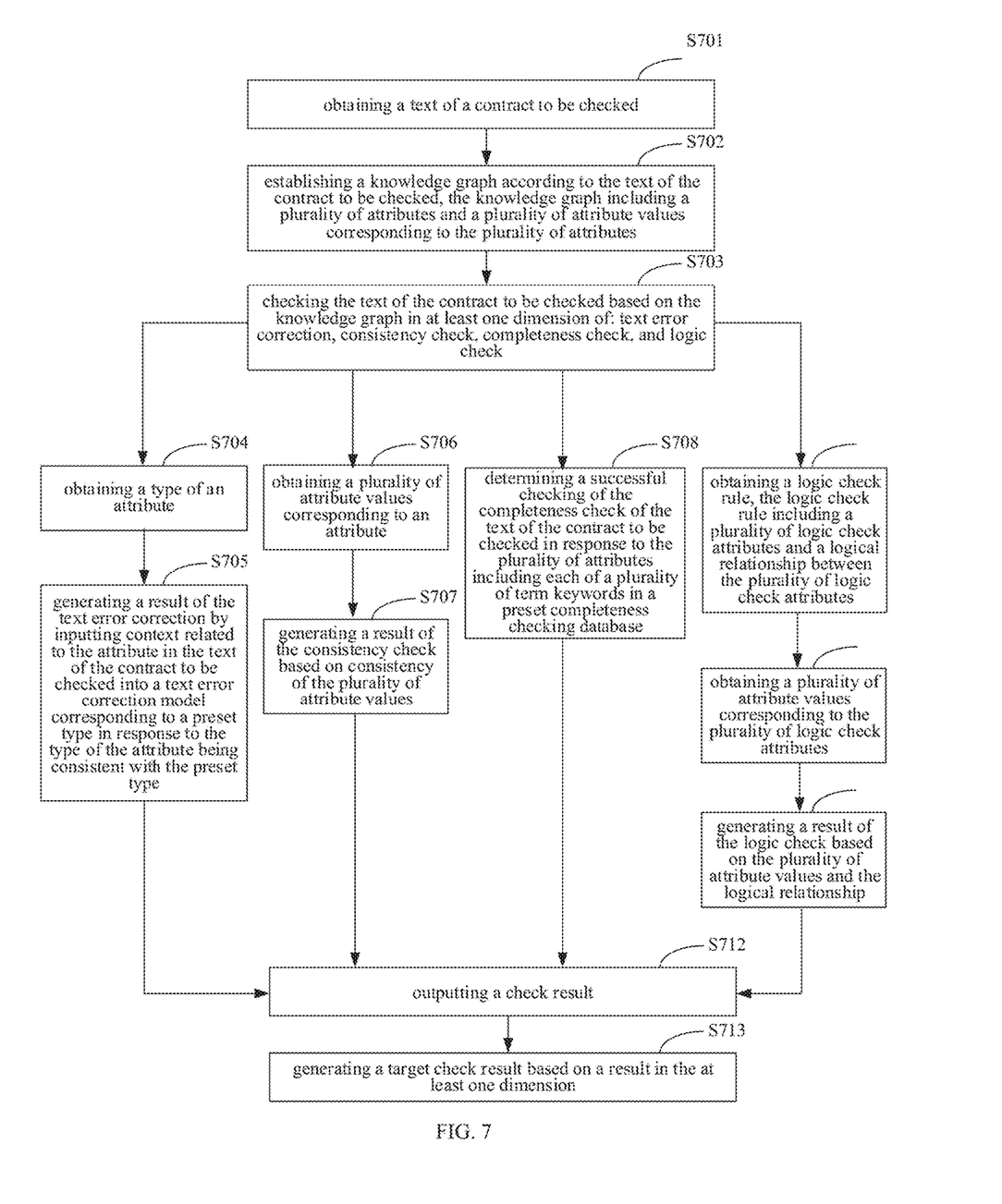
FIG. 7 is an overall flowchart illustrating a text checking method based on a knowledge graph according to an embodiment of the present disclosure.

FIG. 7 is an overall flowchart illustrating a text checking method based on a knowledge graph according to an embodiment of the present disclosure. As illustrated in FIG. 7, the text checking method based on a knowledge graph according to an embodiment of the present disclosure may include the following steps S701-S713.

S701, a text of a contract to be checked is obtained.

S702, a knowledge graph is established according to the text of the contract to be checked.

S703, the text of the contract to be checked is checked based on the knowledge graph in at least one dimension of: text error correction, consistency check, completeness check, and logic check.

If the text error correction is performed, steps S704-S705 are performed; if the consistency check is performed, steps S706-S707 are performed; if the completeness review is performed, step S708 is performed; if the logic check is performed, steps S709-S711 are performed.

S704, a type of an attribute is obtained.

S705, a result of the text error correction is generated by inputting context related to the attribute in the text of the contract to be checked into a text error correction model corresponding to a preset type in response to the type of the attribute being consistent with the preset type. Then step S712 is performed.

S706, a plurality of attribute values corresponding to an attribute are obtained.

S707, a result of the consistency check is generated based on consistency of the plurality of attribute values. Then step S712 is performed.

S708, a successful checking of the completeness check of the text of the contract to be checked is determined in response to the plurality of attributes including each of a plurality of term keywords in a preset completeness checking database. Then step S712 is performed.

S709, a logic check rule is obtained, the logic check rule includes a plurality of logic check attributes and a logical relationship between the plurality of logic check attributes.

S710, a plurality of attribute values corresponding to the plurality of logic check attributes are obtained.

S711, a result of the logic check is generated based on the plurality of attribute values and the logical relationship.

S712, a check result is output.

S713, a target check result is generated based on the result in the at least one dimension.

Figure 8:
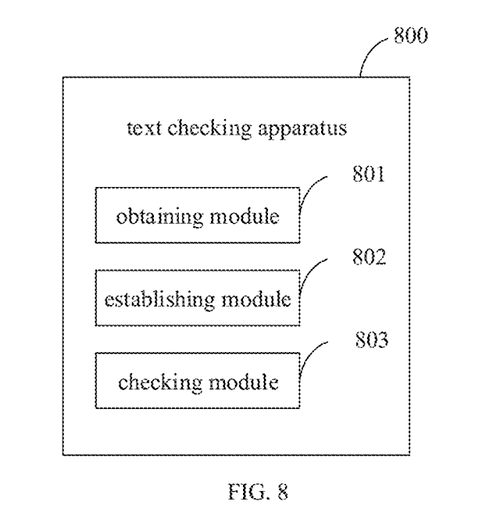
FIG. 8 is a block diagram illustrating a text checking apparatus based on a knowledge graph according to an embodiment of the present disclosure.

FIG. 8 is a block diagram illustrating a text checking apparatus based on a knowledge graph according to an embodiment of the present disclosure.

As illustrated in FIG. 8, the text checking apparatus based on a knowledge graph according to the embodiment of the present disclosure includes an obtaining module 801, an establishing module 802, and a checking module 803.

The obtaining module 801 is configured to obtain a text of a contract to be checked.

The establishing module 802 is configured to establish a knowledge graph according to the text of the contract to be checked, the knowledge graph includes a plurality of attributes and a plurality of attribute values corresponding to the plurality of attributes.

The checking module 803 is configured to check the text of the contract to be checked based on the knowledge graph.

It should be noted that the above explanations of the embodiments of the text checking method based on a knowledge graph are also suitable for the text checking apparatus based on a knowledge graph in the embodiments of the present disclosure, and the detailed process will not be repeated here.

In conclusion, with the text checking apparatus based on a knowledge graph according to the embodiment of the present disclosure, the contract text to be checked is obtained, and the knowledge graph is established according to the contract text to be checked. The knowledge graph includes multiple attributes and attribute values corresponding to the multiple attributes. The contract text is checked based on the knowledge graph. With the text checking method based on a knowledge graph according to the embodiments of the present disclosure, the knowledge graph is established according to the contract text, and the contract text is automatically checked based on the knowledge graph in combination with natural language processing, which saves manpower, and has a faster check speed and reduces identification omission or identification error of risks.

Figure 9:
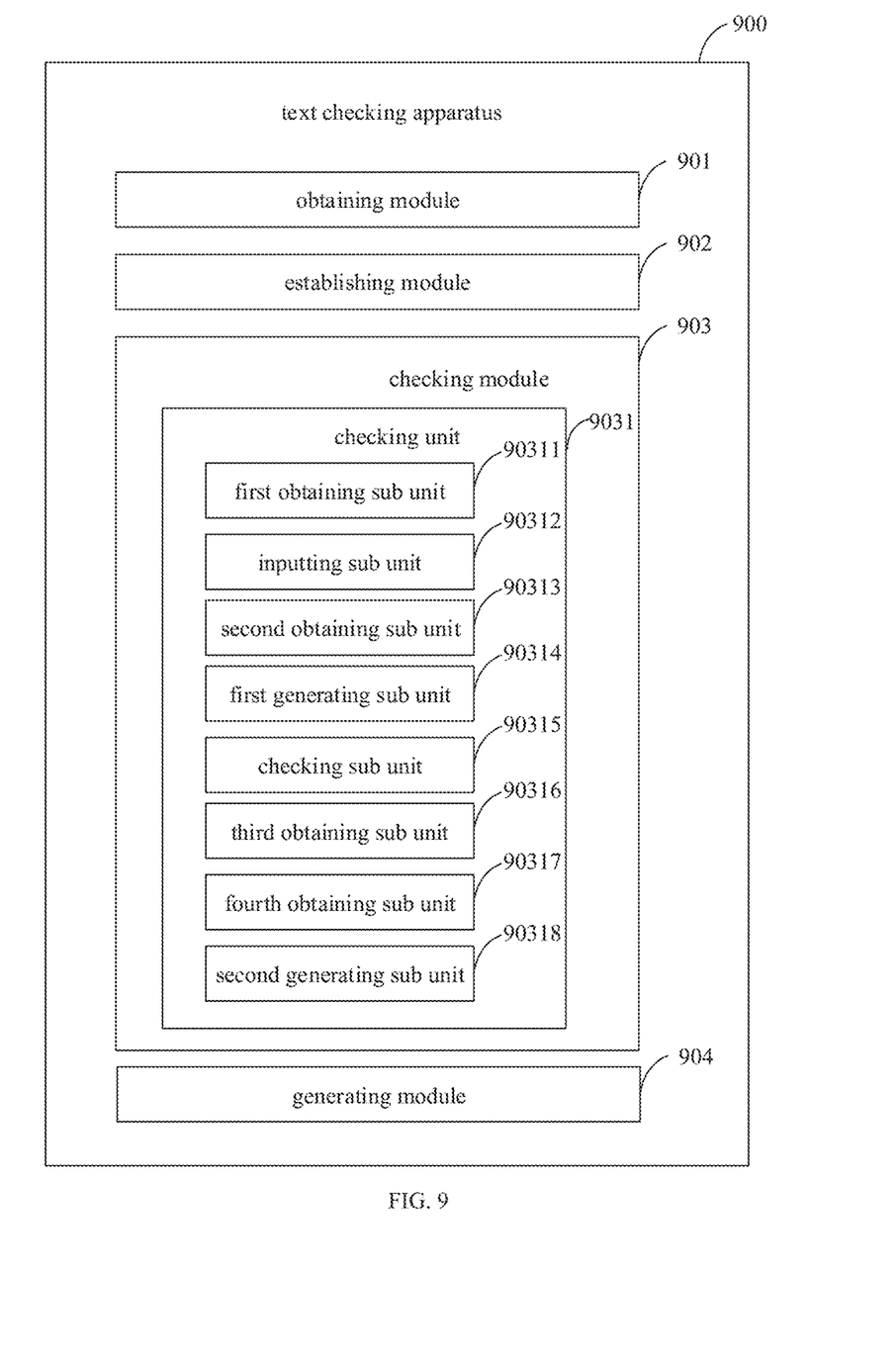
FIG. 9 is a block diagram illustrating a text checking apparatus based on a knowledge graph according to an embodiment of the present disclosure.

FIG. 9 is a block diagram illustrating a text checking apparatus based on a knowledge graph according to an embodiment of the present disclosure.

As illustrated in FIG. 8, the text checking apparatus based on a knowledge graph according to the embodiment of the present disclosure includes an obtaining module 901, an establishing module 902, and a checking module 903.

The obtaining module 901 has the same structure and function as the obtaining module 801 in the above embodiments, the establishing module 902 has the same structure and function as the establishing module 802 in the above embodiment, and the checking module 903 has the same structure and function as the checking module 803 in the above embodiment.

Further, the checking module 903 may include a checking unit 9031. The checking unit 9031 is configured to check the text of the contract to be checked based on the knowledge graph in at least one dimension of: text error correction, consistency check, completeness check, and logic check.

Further, the checking unit 9031 may include a first obtaining sub unit 90311 and an inputting sub unit 90312. The first obtaining sub unit 90311 is configured to: obtain a type of an attribute. The inputting sub unit 90312 is configured to generate a result of the text error correction by inputting context related to the attribute in the text of the contract to be checked into a text error correction model corresponding to a preset type in response to the type of the attribute being consistent with the preset type.

Further, the checking unit 9031 may include a second obtaining sub unit 90313 and a first generating sub unit 90314. The second obtaining sub unit 90313 is configured to obtain a plurality of attribute values corresponding to an attribute. The first generating sub unit 90314 is configured to generate a result of the consistency check based on consistency of the plurality of attribute values.

Further, the checking unit 9031 may include a checking sub unit 90315. The checking sub unit 90315 is configured to determine a successful checking of the completeness check of the text of the contract to be checked in response to the plurality of attributes including each of a plurality of term keywords in a preset completeness checking database.

Further, the checking unit 9031 may include a third obtaining sub unit 90316, a fourth obtaining sub unit 90317, and a second generating sub unit 90318. The third obtaining sub unit 90316 is configured to obtain a logic check rule, the logic check rule includes a plurality of logic check attributes and a logical relationship between the plurality of logic check attributes. The fourth obtaining sub unit 90317 is configured to obtain a plurality of attribute values corresponding to the plurality of logic check attributes. The second generating sub unit 90318 is configured to generate a result of the logic check based on the plurality of attribute values and the logical relationship.

Further, the text checking apparatus based on a knowledge graph according to the embodiment of the present disclosure includes may further include a generating module 904. The generating module 904 is configured to generate a target check result based on a result in the at least one dimension.

In conclusion, with the text checking apparatus based on a knowledge graph according to the embodiment of the present disclosure, the contract text to be checked is obtained, and the knowledge graph is established according to the contract text to be checked. The knowledge graph includes multiple attributes and attribute values corresponding to the multiple attributes. The contract text is checked based on the knowledge graph. With the text checking method based on a knowledge graph according to the embodiments of the present disclosure, the knowledge graph is established according to the contract text, and the contract text is automatically checked based on the knowledge graph in combination with natural language processing, which saves manpower, and has a faster check speed and reduces identification omission or identification error of risks. In addition, the contract text check is decomposed into different dimensions such as the text error correction, the consistency check, the completeness check, and the logic check, and different technical ideas and solutions are adopted to automate the check process, which saves manpower, and has a faster check speed and reduces identification omission or identification error of risks.

In the technical solution of the present disclosure, the collection, storage, use, processing, transmission, provision and disclosure of the user's personal information involved are all carried out under the premise of obtaining the user's consent, and all comply with relevant laws and regulations, and do not violate public orders and good customs.

According to the embodiments of the disclosure, an electronic device, a readable storage medium and a computer program product are further provided in the disclosure.

Figure 10:
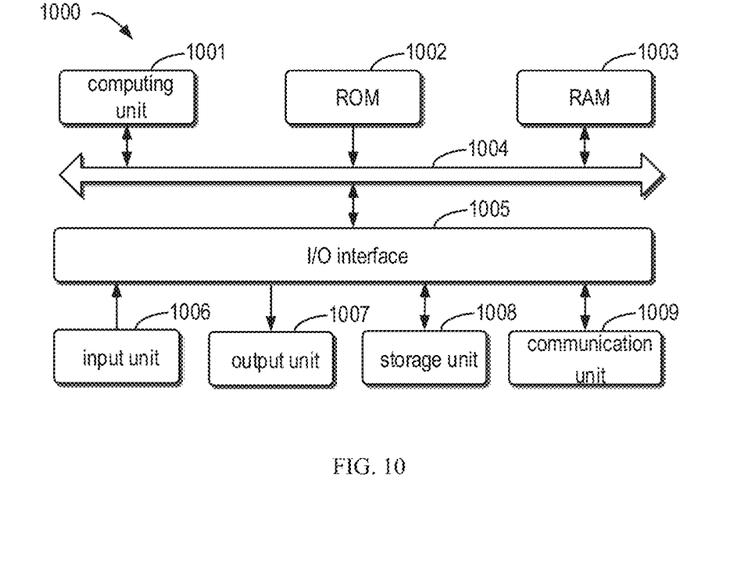
FIG. 10 is a schematic diagram illustrating an electronic device for implementing a text checking method based on a knowledge graph according to an embodiment of the present disclosure.

FIG. 10 is a schematic diagram illustrating an electronic device 1000 for implementing a text checking method based on a knowledge graph according to an embodiment of the present disclosure. The electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 10, a device 1000 includes a computing unit 1001, which may be configured to execute various appropriate actions and processes according to a computer program stored in a read-only memory (ROM) 1002 or loaded from a storage unit 1008 to a random access memory (RAM) 1003. In the RAM 1003, various programs and data required by an operation of the device 1000 may be further stored. The computing unit 1001, the ROM 1002 and the RAM 1003 may be connected with each other by a bus 1004. An input/output (I/O) interface 1005 is also connected to a bus 1004.

A plurality of components in the device 1000 are connected to the I/O interface 1005, including an input unit 1006, for example, a keyboard, a mouse, etc.; an output unit 1007, for example various types of displays, speakers; the storage unit 1008, for example a magnetic disk, an optical disk; and a communication unit 1009, for example, a network card, a modem, a wireless transceiver. The communication unit 1009 allows the device 1000 to exchange information/data through a computer network such as internet and/or various types of telecommunication networks and other devices.

The computing unit 1001 may be various types of general and/or dedicated processing components with processing and computing ability. Some examples of the computing unit 1001 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. The computing unit 1001 performs various methods and processing as described above, for example, the text checking method based on a knowledge graph as illustrated in FIG. 1 to FIG. 7. For example, in some embodiments, the text checking method based on a knowledge graph may be further implemented as a computer software program, which is physically contained in a machine readable medium, such as the storage unit 1008. In some embodiments, a part or all of the computer program may be loaded and/or installed on the device 1000 via a ROM 1002 and/or a communication unit 1009. When the computer program is loaded on the RAM 1003 and performed by the computing unit 1001, one or more steps in the above text checking method based on a knowledge graph may be performed. Alternatively, in other embodiments, the computing unit 1001 may be configured to perform a a text checking method based on a knowledge graph in other appropriate ways (for example, by virtue of a firmware).

Various implementation modes of systems and technologies described herein may be implemented in a digital electronic circuit system, an integrated circuit system, a field programmable gate array (FPGA), a dedicated application specific integrated circuit (ASIC), an application specific standard product (ASSP), a system on a chip (SoC), a complex programmable logic device (CPLD), a computer hardware, a firmware, a software, and/or combinations thereof. The various implementation modes may include:

being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the present disclosure may be written with one or any combination of a plurality of programming languages. The programming languages may be provided to a processor or a controller of a general purpose computer, a dedicated computer, or other apparatuses for programmable data processing so that the function/operation specified in the flowchart and/or block diagram may be performed when the program code is executed by the processor or controller. A computer code may be performed completely or partly on the machine, performed partly on the machine as an independent software package and performed partly or completely on the remote machine or server.

In the context of the disclosure, a machine-readable medium may be a tangible medium that may contain or store a program intended for use in or in conjunction with an instruction execution system, apparatus, or device. A machine readable medium may be a machine readable signal medium or a machine readable storage medium. A machine readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an electrically programmable read-only memory (an EPROM or a flash memory), an optical fiber device, and a compact disc read-only memory (CD-ROM), an optical storage device, a magnetic storage device, or any appropriate combination thereof.

In order to provide interaction with the user, the systems and technologies described here may be implemented on a computer, and the computer has: a display apparatus for displaying information to the user (for example, a cathode ray tube (CRT) or a liquid crystal display (LCD) monitor); and a keyboard and a pointing apparatus (for example, a mouse or a trackball) through which the user may provide input to the computer. Other types of apparatuses may be further configured to provide interaction with the user; for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). The examples of a communication network include a local area network (LAN), a wide area network (WAN), an internet and a blockchain network.

The computer system may include a client and a server. The client and the server are generally far away from each other and generally interact with each other through a communication network. The relationship between the client and the server is generated by computer programs running on the corresponding computer and having a client-server relationship with each other. The server may be a cloud server, servers of a distributed system, or a server combined with a blockchain.

According to embodiments of the present disclosure, the present disclosure further provides a computer program product including a computer program. When the computer program is executed by a processor, steps of the text checking method based on a knowledge graph according to above embodiments of the present disclosure are implemented.

It should be understood that, various forms of procedures shown above may be configured to reorder, add or delete blocks. For example, blocks described in the disclosure may be performed in parallel, sequentially, or in a different order, as long as the desired result of the technical solution disclosed in the present disclosure may be achieved, which will not be limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of the disclosure.

What is claimed is:

1. A text checking method based on a knowledge graph, performed by a text checking apparatus based on the knowledge graph, comprising:
   obtaining a text of a contract to be checked;
   establishing a knowledge graph according to the text of the contract to be checked, wherein the knowledge graph comprises a plurality of attributes and a plurality of attribute values corresponding to the plurality of attributes;
   checking the text of the contract to be checked based on the knowledge graph,
   generating a target check result based on a result in at least one dimension; and
   determining whether the text of the contract needs to be modified based on the target check result, comprising:
   in the case that a result of one dimension is failed, determining that the target check result is failed and the contract text is modified; and in the case that all the results in the at least one dimension are successful, determining that the target check result is successful and the contract text does not need to be modified,
   wherein checking the text of the contract to be checked based on the knowledge graph comprises:
   checking the text of the contract to be checked based on the knowledge graph in the at least one dimension of: text error correction, consistency check, completeness check, and logic check,
   wherein performing the text error correction on the text of the contract to be checked based on the knowledge graph comprises:

obtaining a type of an attribute; and generating a result of the text error correction by inputting context related to the attribute in the text of the contract to be checked into a text error correction model corresponding to a preset type in response to the type of the attribute being consistent with the preset type, wherein performing the completeness check on the text of the contract to be checked based on the knowledge graph comprises:

determining a successful checking of the completeness check of the text of the contract to be checked in response to the plurality of attributes comprising each of a plurality of term keywords in a preset completeness checking database.

2. The method according to claim 1, wherein performing the consistency check on the text of the contract to be checked based on the knowledge graph comprises:

obtaining a plurality of attribute values corresponding to an attribute; and generating a result of the consistency check based on consistency of the plurality of attribute values.

3. The method according to claim 1, wherein performing the logic check on the text of the contract to be checked based on the knowledge graph comprises:

obtaining a logic check rule, wherein the logic check rule comprises a plurality of logic check attributes and a logical relationship between the plurality of logic check attributes;

obtaining a plurality of attribute values corresponding to the plurality of logic check attributes; and generating a result of the logic check based on the plurality of attribute values and the logical relationship.

4. An electronic device, comprising:

at least one processor; and a memory communicatively connected to the at least one processor; wherein, the memory is stored with instructions executable by the at least one processor, when the instructions are performed by the at least one processor, the at least one processor is caused to perform a text checking method based on a knowledge graph, the method comprising:

obtaining a text of a contract to be checked;

establishing a knowledge graph according to the text of the contract to be checked, wherein the knowledge graph comprises a plurality of attributes and a plurality of attribute values corresponding to the plurality of attributes; and checking the text of the contract to be checked based on the knowledge graph, generating a target check result based on a result in at least one dimension; and determining whether the text of the contract needs to be modified based on the target check result, comprising:

in the case that a result of one dimension is failed, determining that the target check result is failed and the contract text is modified; and in the case that all the results in the at least one dimension are successful, determining that the target check result is successful and the contract text does not need to be modified, wherein checking the text of the contract to be checked based on the knowledge graph comprises: checking the text of the contract to be checked based on the knowledge graph in the at least one dimension of: text error correction, consistency check, completeness check, and logic check, wherein performing the text error correction on the text of the contract to be checked based on the knowledge graph comprises:

obtaining a type of an attribute; and generating a result of the text error correction by inputting context related to the attribute in the text of the contract to be checked into a text error correction model corresponding to a preset type in response to the type of the attribute being consistent with the preset type, wherein performing the completeness check on the text of the contract to be checked based on the knowledge graph comprises:

determining a successful checking of the completeness check of the text of the contract to be checked in response to the plurality of attributes comprising each of a plurality of term keywords in a preset completeness checking database.

5. The electronic device according to claim 4, wherein performing the consistency check on the text of the contract to be checked based on the knowledge graph comprises:

obtaining a plurality of attribute values corresponding to an attribute; and generating a result of the consistency check based on consistency of the plurality of attribute values.

6. The electronic device according to claim 4, wherein performing the logic check on the text of the contract to be checked based on the knowledge graph comprises:

obtaining a logic check rule, wherein the logic check rule comprises a plurality of logic check attributes and a logical relationship between the plurality of logic check attributes;

obtaining a plurality of attribute values corresponding to the plurality of logic check attributes; and generating a result of the logic check based on the plurality of attribute values and the logical relationship.

7. A non-transitory computer readable storage medium stored with computer instructions, wherein, the computer instructions are configured to cause a computer to perform a text checking method based on a knowledge graph, the method comprising:

obtaining a text of a contract to be checked;

establishing a knowledge graph according to the text of the contract to be checked, wherein the knowledge graph comprises a plurality of attributes and a plurality of attribute values corresponding to the plurality of attributes; and checking the text of the contract to be checked based on the knowledge graph, generating a target check result based on a result in at least one dimension; and determining whether the text of the contract needs to be modified based on the target check result, comprising:

in the case that a result of one dimension is failed, determining that the target check result is failed and the contract text is modified; and in the case that all the results in the at least one dimension are successful, determining that the target check result is successful and the contract text does not need to be modified, wherein checking the text of the contract to be checked based on the knowledge graph comprises: checking the text of the contract to be checked based on the knowledge graph in the at least one dimension of: text error correction, consistency check, completeness check, and logic check, wherein performing the text error correction on the text of the contract to be checked based on the knowledge graph comprises:

obtaining a type of an attribute; and generating a result of the text error correction by inputting context related to the attribute in the text of the contract to be checked into a text error correction model corresponding to a preset type in response to the type of the attribute being consistent with the preset type, wherein performing the completeness check on the text of the contract to be checked based on the knowledge graph comprises:

determining a successful checking of the completeness check of the text of the contract to be checked in response to the plurality of attributes comprising each of a plurality of term keywords in a preset completeness checking database.

8. The non-transitory computer readable storage medium according to claim 7, wherein performing the consistency check on the text of the contract to be checked based on the knowledge graph comprises:

obtaining a plurality of attribute values corresponding to an attribute; and generating a result of the consistency check based on consistency of the plurality of attribute values.

9. The non-transitory computer readable storage medium according to claim 7, wherein performing the logic check on the text of the contract to be checked based on the knowledge graph comprises:

obtaining a logic check rule, wherein the logic check rule comprises a plurality of logic check attributes and a logical relationship between the plurality of logic check attributes;

obtaining a plurality of attribute values corresponding to the plurality of logic check attributes; and generating a result of the logic check based on the plurality of attribute values and the logical relationship.

* * * * *